(12) United States Patent
Pettey et al.

(10) Patent No.: US 11,149,767 B2
(45) Date of Patent: Oct. 19, 2021

(54) CLAMPING HUB

(71) Applicant: ROBOTZONE, LLC, Winfield, KS (US)

(72) Inventors: Brian T. Pettey, Winfield, KS (US); Kyle Lewis, Winfield, KS (US); Jason Jaeger, Winfield, KS (US)

(73) Assignee: Robotzone, LLC, Winfield, KS (US)

( * ) Notice: Subject to any disclaimer, the term of this patent is extended or adjusted under 35 U.S.C. 154(b) by 442 days.

(21) Appl. No.: 16/150,887

(22) Filed: Oct. 3, 2018

(65) Prior Publication Data

US 2020/0109724 A1 Apr. 9, 2020

(51) Int. Cl.
*F16B 2/06* (2006.01)
*F16D 1/08* (2006.01)
*F16D 1/10* (2006.01)

(52) U.S. Cl.
CPC ............ *F16B 2/065* (2013.01); *F16D 1/0847* (2013.01); *F16D 1/0864* (2013.01); *F16D 2001/102* (2013.01)

(58) Field of Classification Search
CPC ...... F16B 2/065; F16D 1/0847; F16D 1/0864; F16D 1/087; F16D 2001/102; Y10T 403/3953; Y10T 403/53; Y10T 403/535; Y10T 403/69; Y10T 403/7069
USPC ...................... 403/195, 289, 290, 344, 374.3
See application file for complete search history.

(56) References Cited

U.S. PATENT DOCUMENTS

| | | |
|---|---|---|
| 1,166,688 A | 1/1916 | Hornby |
| 1,763,302 A | 6/1930 | Gilbert |
| 1,789,896 A | 1/1931 | Gilbert |
| 1,792,976 A | 2/1931 | Gilbert |
| 2,082,138 A | 6/1937 | Bade |
| 2,095,700 A | 10/1937 | Heede |
| 2,124,748 A | 7/1938 | Ransom, Jr. |
| 2,269,821 A | 1/1942 | Kemphert et al. |
| 2,306,876 A | 12/1942 | Frank |
| 2,466,097 A | 4/1949 | Grace |
| 2,804,322 A | 8/1957 | Carl |
| 2,933,934 A | 4/1960 | Haroldson |
| 3,355,837 A | 12/1967 | Pedersen |
| 3,598,432 A | 8/1971 | Walker |

(Continued)

FOREIGN PATENT DOCUMENTS

| | | | |
|---|---|---|---|
| DE | 102010005073 A1 * | 7/2011 | ........... F16D 1/0864 |
| DE | 102010006073 A1 | 7/2011 | |

(Continued)

OTHER PUBLICATIONS https://www.superdroidrobots.com/shop/item.aspx/steel-d-shaft-sprocket-for-25-pitch-chain-15-teeth/2209, Apr. 15, 2019, 2 pages.

*Primary Examiner* — Josh Skroupa
(74) *Attorney, Agent, or Firm* — Wesley Malherek; Kelly, Holt & Christenson PLLC

(57) ABSTRACT

A clamping hub includes a body and an aperture, defined by the body, configured to receive a shaft. The clamping hub also includes a clamp configured to secure the shaft in the aperture. the clamp includes a first deformable component that defines a first portion of the aperture and configured to, when deformed, change a size of the aperture and a second deformable component that defines a second portion of the aperture opposite from the first portion of the aperture and configured to, when deformed, change the size of the aperture.

16 Claims, 9 Drawing Sheets

(56) References Cited

U.S. PATENT DOCUMENTS

| | | | |
|---|---|---|---|
| 3,708,243 A | | 1/1973 | Wooden |
| 3,851,983 A | * | 12/1974 | MacKenzie ........... F16D 1/0864 |
| | | | 403/312 |
| 3,917,424 A | * | 11/1975 | Zugel .................... F16D 1/0864 |
| | | | 403/344 |
| 3,937,595 A | | 2/1976 | English et al. |
| 4,006,993 A | | 2/1977 | Woerlee |
| 4,067,658 A | | 1/1978 | Ueno et al. |
| 4,142,811 A | | 3/1979 | Burnham |
| 4,274,036 A | | 6/1981 | Fukasaku et al. |
| 4,475,475 A | | 10/1984 | Zylbert |
| 4,565,464 A | * | 1/1986 | Nilsson ................. F16D 1/0864 |
| | | | 403/290 |
| 4,848,951 A | | 7/1989 | Boogerman |
| 4,884,824 A | | 12/1989 | Radke |
| 4,984,931 A | | 1/1991 | Struthers et al. |
| 5,052,842 A | | 10/1991 | Janatka |
| 5,062,734 A | | 11/1991 | Vanzee |
| 5,067,845 A | | 11/1991 | Schlueter |
| 5,306,096 A | | 4/1994 | Tuns et al. |
| 5,580,184 A | | 12/1996 | Riccitelli |
| 5,851,084 A | * | 12/1998 | Nishikawa ........... F16D 1/0864 |
| | | | 403/290 |
| 6,364,720 B1 | | 4/2002 | Liang |
| 6,390,721 B1 | | 5/2002 | Wilson, II |
| 6,619,878 B2 | | 9/2003 | Wang et al. |
| 6,682,432 B1 | * | 1/2004 | Shinozuka ............. F16B 2/065 |
| | | | 403/290 |
| 6,905,249 B2 | | 6/2005 | Schill et al. |
| 7,243,562 B2 | | 7/2007 | Enright |
| 7,284,457 B2 | | 10/2007 | Jinno et al. |
| 7,371,027 B2 | * | 5/2008 | Mochizuki ............. F16B 5/025 |
| | | | 403/289 |
| 7,431,531 B2 | | 10/2008 | Carnevall |
| 7,524,132 B2 | | 4/2009 | Horen et al. |
| 7,930,826 B2 | | 4/2011 | Inoue et al. |
| 8,453,987 B2 | | 6/2013 | Pettey |
| 8,816,553 B2 | | 2/2014 | Pettey |
| 9,038,621 B2 | | 5/2015 | Cadima |
| 9,181,985 B2 | * | 11/2015 | Carlson ................. F16D 1/0864 |
| 9,291,205 B2 | | 3/2016 | Widenmeyer |
| 9,550,130 B2 | | 1/2017 | Pettey |
| 9,581,205 B2 | | 2/2017 | Knoth |
| D827,573 S | | 9/2018 | Pettey |
| 10,093,505 B2 | * | 10/2018 | Ito .......................... B65H 27/00 |
| 10,125,854 B2 | | 11/2018 | Lingren et al. |
| 10,215,264 B2 | | 2/2019 | Ungar et al. |
| 2003/0063948 A1 | * | 4/2003 | Liu ....................... F16D 1/0864 |
| | | | 403/344 |
| 2009/0247045 A1 | | 10/2009 | Pettey |
| 2012/0231892 A1 | * | 9/2012 | Las Navas Garcia ...................... |
| | | | F16D 1/0864 |
| | | | 464/61.1 |
| 2015/0016878 A1 | * | 1/2015 | Isaacson ................. B62D 1/10 |
| | | | 403/327 |
| 2015/0354636 A1 | * | 12/2015 | Kaneda ................. F16D 1/0864 |
| | | | 464/93 |
| 2016/0160929 A1 | | 6/2016 | Janatka |
| 2018/0112691 A1 | | 4/2018 | Pettey |
| 2019/0154085 A1 | | 5/2019 | Watanabe |

FOREIGN PATENT DOCUMENTS

| | | | |
|---|---|---|---|
| DE | 102013007767 A1 | * 11/2014 | ........... F16D 1/0864 |
| DE | 102013007767 A1 | 11/2014 | |

* cited by examiner

CLAMPING HUB

BACKGROUND

Hobby robotics is a growing industry. In this industry, it is common to use various structural and motion components to build a project. Structural components can include channels, extrusions, beans, brackets, blocks, hubs, etc. Motion components can include stepper or servo motors, linear actuators, shafts, clevises, gears, etc.

SUMMARY

A clamping hub includes a body and an aperture, defined by the body, configured to receive a shaft. The clamping hub also includes a clamp configured to secure the shaft in the aperture. the clamp includes a first deformable component that defines a first portion of the aperture and configured to, when deformed, change a size of the aperture and a second deformable component that defines a second portion of the aperture opposite from the first portion of the aperture and configured to, when deformed, change the size of the aperture.

DETAILED DESCRIPTION OF ILLUSTRATIVE EMBODIMENTS

In the field of robotics industry, it is common to use various structural and motion components to build a project. Structural components can include channels, extrusions, beans, brackets, blocks, hubs, etc. Motion components can include stepper or servo motors, linear actuators, shafts, clevises, gears, etc. There are a variety of different ways to secure structure components to motion components. This disclosure relates to a hub used to couple motion and or structural components to one another.

Some hubs include a set screw that couples to an index on a shaft (e.g., the flat portion of a D-shaped shaft). This set screw may couple the hub to the shaft, however, when tightening the set screw, it may damage the shaft. To solve the problem of the damage by the set screw, a hub could clamp around the shaft. However, most clamps are not balanced because they have a clamping fastener on one side. This can cause problems in high speed applications. For instance, the unbalanced part rotating can cause "wobble" which can cause imprecise movement and even damage to the driving motor or shaft. Also most clamping involves some deformation of the hub. This deformation can cause mounting features (e.g., threaded holes, etc.) to not align properly with accessories. An example hub in accordance with this disclosure solves all the above-mentioned problems.

Figure 1:
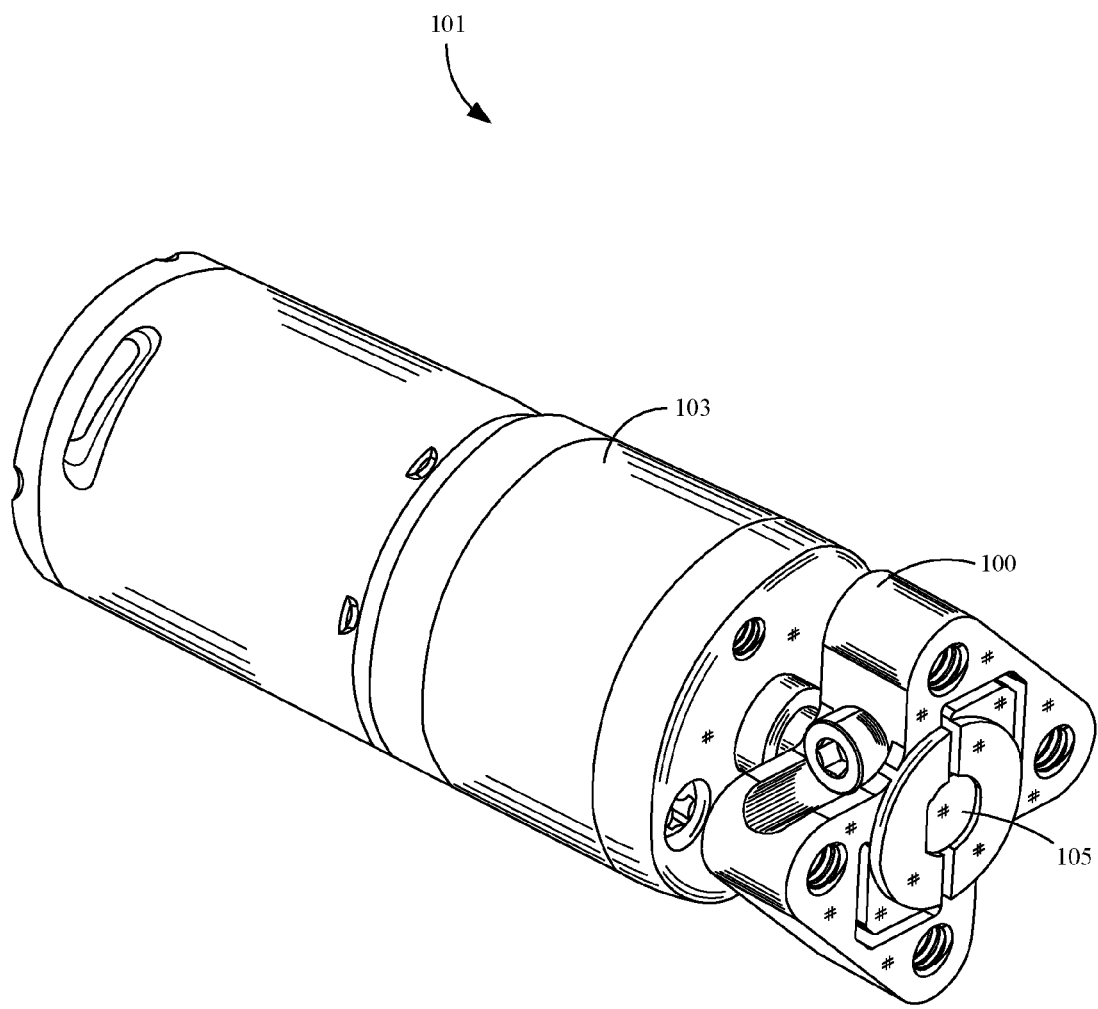
FIG. 1 is a perspective view showing one example of a clamping hub and servo motor assembly.

FIG. 1 is a perspective view showing one example of a hub and servo motor assembly. Assembly 101 includes a servo motor 103, servo shaft 105 and hub 100. Servo motor 103 drives rotational motion of servo shaft 105. Hub 100 is coupled to servo shaft 105 and is also driven by servo motor 103. Hub 100 comprises various features to allow a component to be coupled to hub 100 and therefore also driven by servo motor 103. For example, some of these components are shown in FIGS. 4A-F.

Figure 2A:
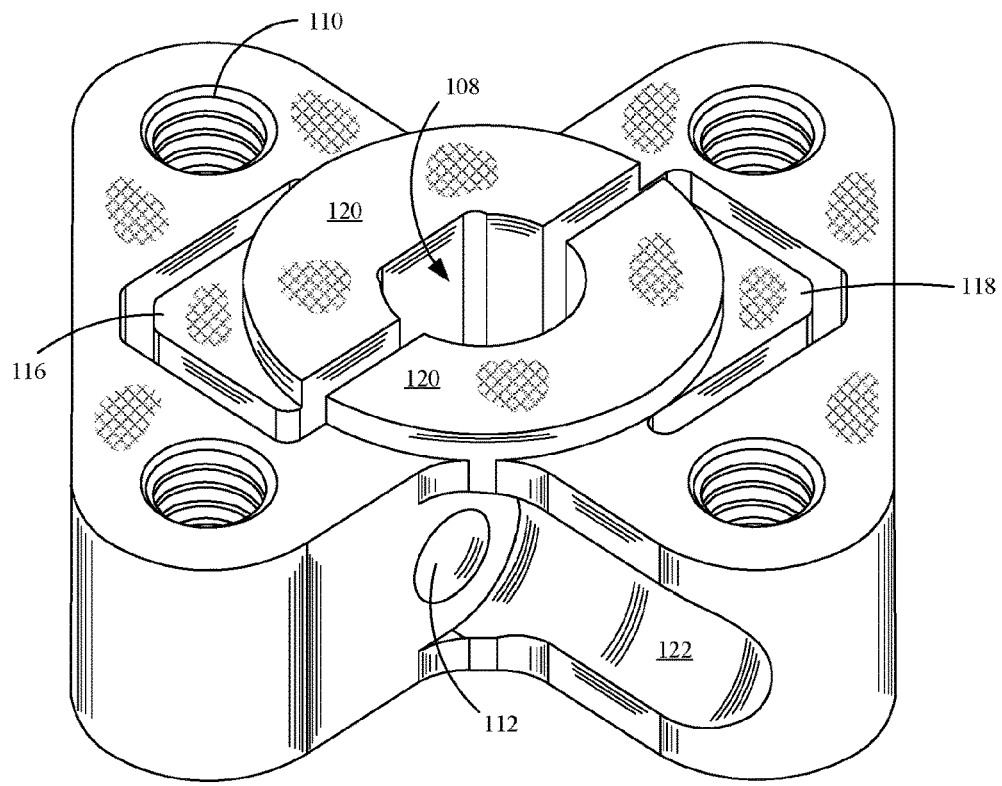
FIGS. 2A-B are top and bottom perspective views showing one example a clamping hub.
Figure 2B:
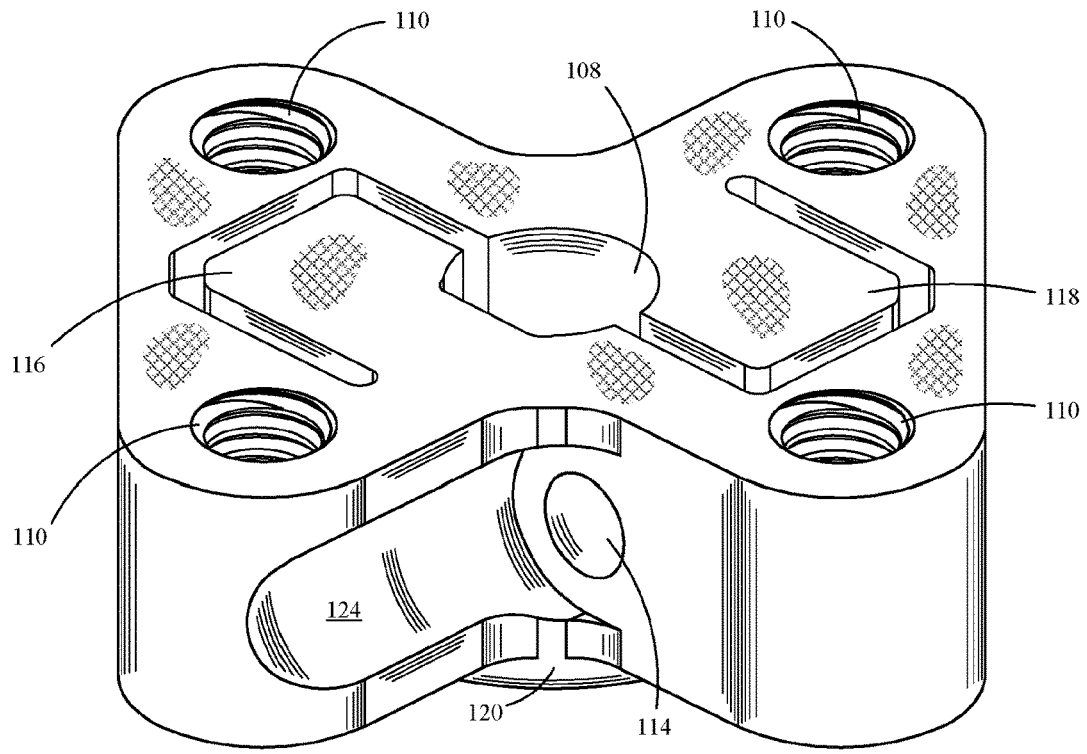

FIGS. 2A-B are top and bottom perspective view showing one example of a hub 100. Top view of hub 100 includes shaft aperture 108, attachment apertures 110, first deformable feature 116, second deformable feature 118 and alignment extrusion 120.

Shaft aperture 108 is configured to receive a shaft, that hub 100 can coupled to. Shaft aperture 108 may be shaped to accommodate a variety of different shafts. As shown, shaft aperture 108 is shaped to accommodate a D shaped shaft. In other examples, shaft aperture 108 may be shaped in other shapes as well, for example, such as, square, hexagonal, round, various spline types, etc. Shaft aperture 108, as shown, includes a through hole aperture. In another example, the aperture of shaft aperture 108 is a blind hole and does not extend fully through the hub.

Shaft aperture 108 as shown is partially defined by first deformable feature 116 and second deformable feature 118. First deformable feature 116 and second deformable feature 118 are able to deform and change the cross-sectional dimensions of shaft aperture 108. For example, shaft aperture 108 may be sized to fit a shaft of a given diameter (e.g. 8 mm), then first deformable feature 116 and second deformable feature 118 may be deformed (e.g. effectively changing the cross-sectional dimensions of shaft aperture 108) to tighten shaft aperture 108 onto the shaft. In some examples, the dimensions of shaft aperture 108 do not change, as the shaft fully fits in shaft aperture 108, however, first deformable feature 116 and second deformable feature 118 may still provide a gripping force on the received shaft.

First deformable feature 116 can be deformed by receiving a first fastener that is inserted through first through aperture 112. Second deformable feature 118 can be deformed by receiving a second fastener through second through aperture 114. Both first deformable feature 116 and second deformable feature 118 include threaded apertures (not shown in FIGS. 2A-2B) that receive their respective fastener. As the first fastener, inserted into first through aperture 112, tightens on the threads of first deformable feature 116, it pulls first deformable feature 116 towards first through aperture 112. As the second fastener, inserted into second through aperture 114 tightens on the threads of second deformable feature 118, it pulls second deformable feature 118 towards second through aperture 114. When one of the deformable features deform towards its respective through hole, they deform the cross-sectional dimensions of shaft aperture 108.

To accommodate for the first fastener to fit into and through first through aperture 112, a first fastener cutout 122 can be provided. Similarly, for the second fastener to fit into and through second through aperture 114, a second fastener cutout 124 can be provided. First and second fastener cutouts can be shaped to accommodate a given type of fastener (e.g. a bolt, machine screw, hex head screw, etc.). In another example, first and second fastener cutouts can be shaped to accommodate a tool used to tighten the fastener (e.g. a screwdriver, hex key, etc.). First and second fastener cutouts may also reduce the overall weight of hub 100 and/or reduce the overall dimensions of hub 100.

Hub 100 includes alignment extrusion 120 and attachment apertures 110. An accessory can be coupled to hub 100 using attachment apertures 110. The accessory can be aligned on the hub with the assistance of alignment extrusion 120. As shown, there are four attachment apertures 110. In another example, hub 100 includes a different number of attachment apertures 110. Attachment apertures 110 receive fasteners that secure an accessory (not shown). As shown attachment apertures 110 are threaded apertures that receive a threaded fastener. In another example, attachment apertures 110 can be clearance holes that accept different fastener assemblies (e.g., a bolt that couples to a nut).

In the shown example, these attachment apertures 110 are through hole apertures. In another example, attachment apertures 110 are blind hole apertures and do not extend fully through the hub. The spacing between attachment apertures 110 may correspond to an accessory that is to be attached to hub 100. In one example, attachment apertures 110 are substantially in a 1.5"×1.5" from center square orientation. In one example, attachment apertures 110 are substantially in a 0.544"×0.544" (0.770" diagonal) from center square orientation. Another example, attachment apertures 110 are substantially in a 16 mm by 16 mm square pattern. In one example, attachment apertures 110 are 6-32 threaded apertures. In another example, attachment apertures 110 are M4 threaded apertures.

Alignment extrusion 120, as shown, extrudes outward from hub 100 on only one side. In another example, alignment extrusion 120 extrudes outward from hub 100 on both sides. Alignment extrusion 120 can increase the surface area between shaft and shaft aperture 108. Alignment extrusion 120 can also align an accessory mounted to hub 100. In one example, alignment extrusion 120 extrudes substantially 0.1" away from hub 100.

Figure 2C:
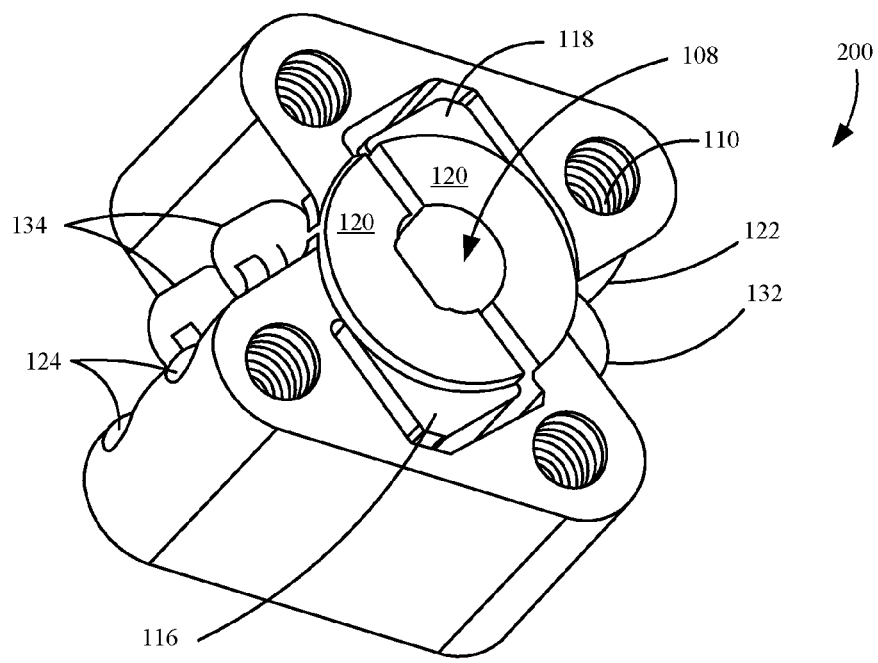
FIGS. 2C-D are top and bottom perspective views showing one example a clamping hub.
Figure 2D:
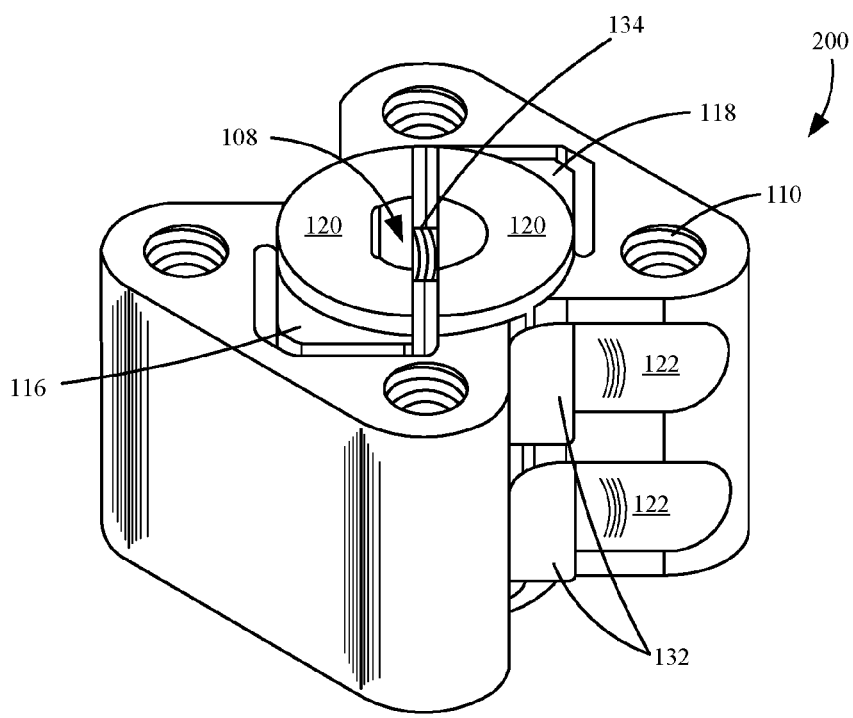

FIGS. 2C and 2D are views showing an example hub. The hub of FIGS. 2C and 2D are similar to that of FIGS. 2A and 2B and similar components are numbered similarly. One difference between the hub 200 of FIGS. 2C and 2D from hub 100 in FIGS. 2A and 2B is that the hub 200 has a greater depth. Greater hub depth can allow for more surface area in contact between the shaft and shaft aperture 108. In one example, the depth of hub 200 is substantially 1 inch. In one example, depth of hub 200 substantially 0.5 inch. In one example, the depth of hub 100 is substantially 0.275 inch. In one example, the depth of hub 100 is substantially 0.375 inch. In one example, the depth of hub 200 is substantially 0.375 inch.

Additionally, hub 200 has more than one first fastener 132 and more than one second fastener 134. This may be beneficial where a shaft has a circular cross-section or other cross-section which is prone to slipping. Having multiple fasteners that tighten shaft aperture 108 can increase the gripping force on a received shaft to ensure that hub 200 does not slip on the shaft. Accordingly, with the additional fasteners, there are multiple first through apertures 112 and first fastener cutouts 122. There are also multiple second through apertures 114 and second fastener cutouts 124 to accommodate the additional fasteners.

Figure 3:
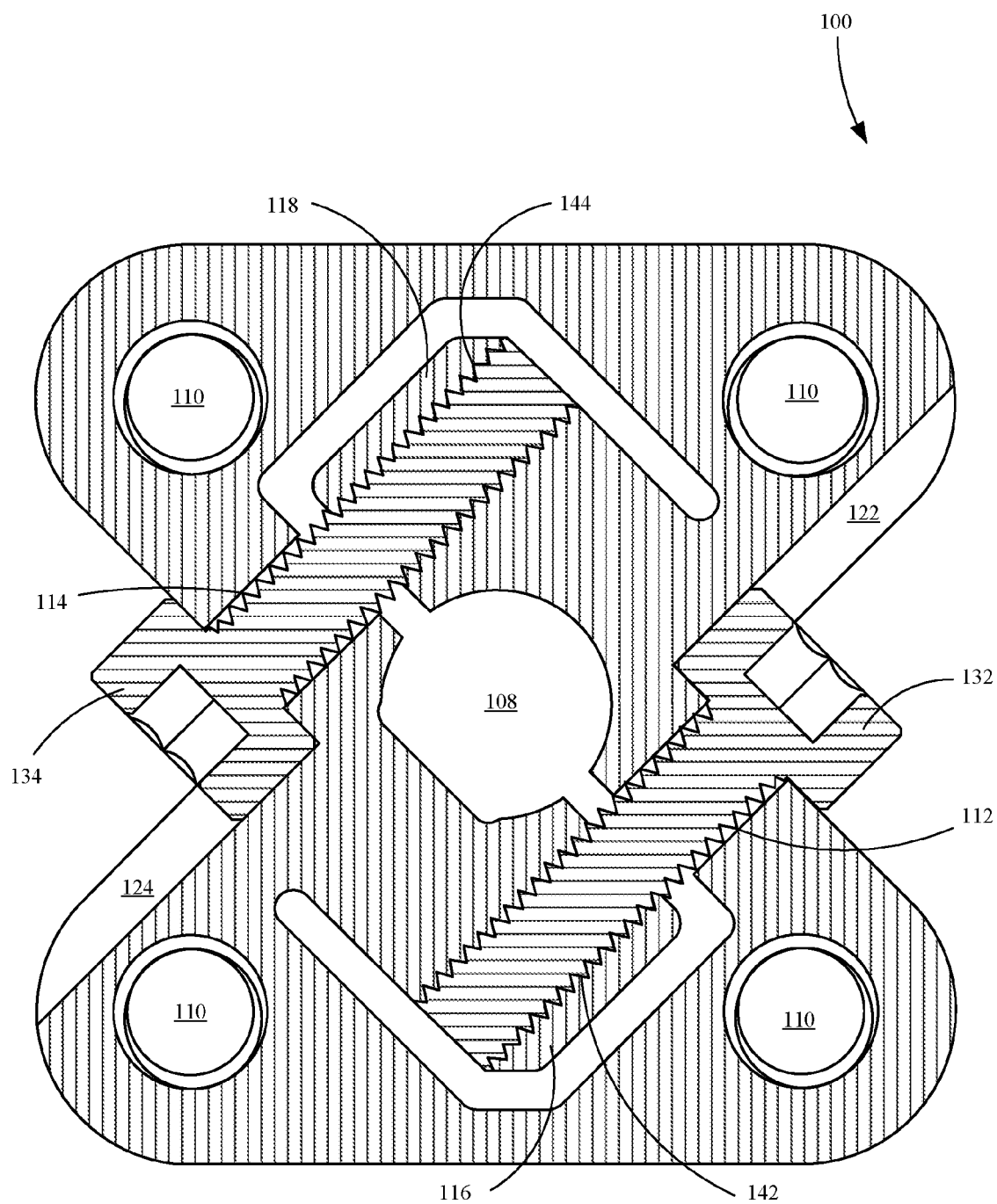
FIG. 3 is a cutaway view of one example of a clamping hub.

FIG. 3 is a cutaway view showing one example of hub. As shown in FIG. 3 are first fastener 132 and second fastener 134. First fastener 132 is inserted through aperture 112 and engages threaded aperture 142 of first deformable feature 116. As first fastener 132 is tightened into threaded aperture 142, it can only pull so far into the body of hub 100 before it contacts the body of hub 100. After first fastener 132 contacts the body of hub 100, tightening first fastener 132 into threaded aperture 142 will begin to pull first deformable feature 116 towards aperture 112. In one example, because of the shape of first deformable feature 116, very little or no deformation of other portions of the hub should occur (e.g., the positions of attachment apertures 110 relative to one another does not change).

Second fastener 134 is inserted through aperture 114 and engages threaded aperture 144 of second deformable feature 118. As second fastener 134 is tightened into threaded aperture 144, it can only pull so far into the body of hub 100 before it contacts the body of hub 100. After second fastener 134 contacts the body of hub 100, tightening second fastener 134 into threaded aperture 144 will begin to pull second deformable feature 118 towards aperture 114. In one example, because of the shape of second deformable feature 118, very little or no deformation of other portions of the hub should occur (e.g., the positions of attachment apertures 110 relative to one another does not change).

The alignment of first fastener 132 and second fastener 134 (and their corresponding components) is mirrored and can place the center of mass of hub 100 substantially at the center of rotation of hub 100 when it is coupled to a rotating shaft.

Figure 4A:
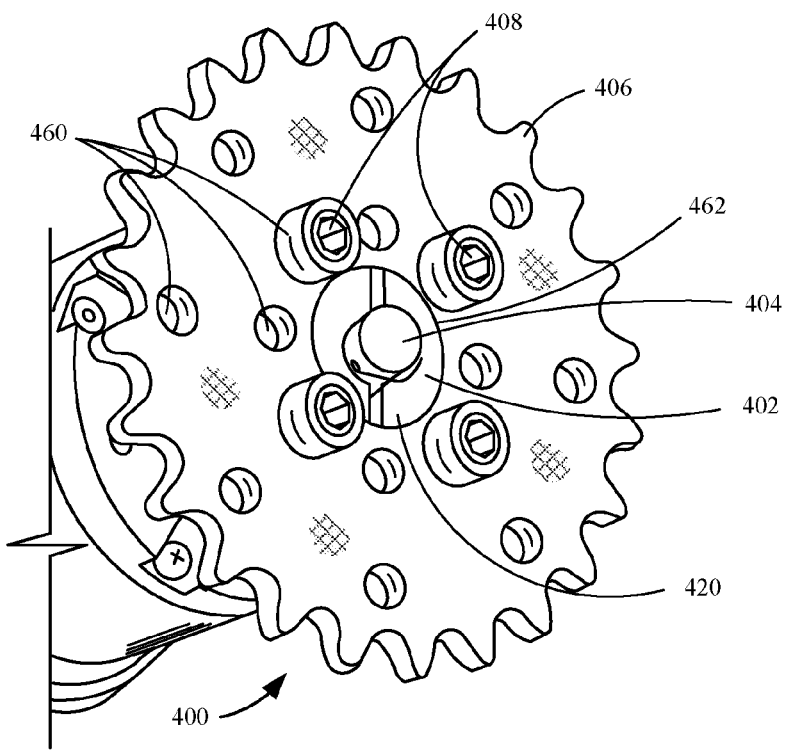
FIGS. 4A-F are various views of different example attachment assemblies.

FIG. 4A is a front view showing one example of an attachment assembly. Assembly 400 includes hub 402, shaft 404, accessory 406, and fasteners 408. Hub 402 is secured onto shaft 404. As shown, accessory 406 is a sprocket. However, other suitable accessories are also possible, including, but not limited to, those shown in FIGS. 4A-F. Accessory 406 is secured to hub 402 by fasteners 408. As shown, fasteners 408 are socket cap screws. In another example, fasteners 408 could be another type of fastener, for example, but not limited to, rivets, machine screws, bolts, nuts, weld, etc. Fasteners 408, as show are inserted through mounting apertures 460 of the accessory 406. As shown, there are four fasteners 408, however, in other examples there may be a different number of fasteners 408. As shown, there are plurality of mounting apertures 460 where hub 402 can be secured. In another example, there is only one set of mounting apertures 460 corresponding to the apertures on the hub. Accessory 406, in one example, is centered on hub 402 by aligning aperture 462 of accessory 406 contacting aligning extrusion 420 of hub 402. As shown, aligning aperture 462 and aligning extrusion 420 have a circular cross-section, however, the cross-section may be a different non-circular shape. For example, aligning aperture 462 and aligning extrusion 420 may have corresponding features that orient the accessory in a specific orientation.

Figure 4B:
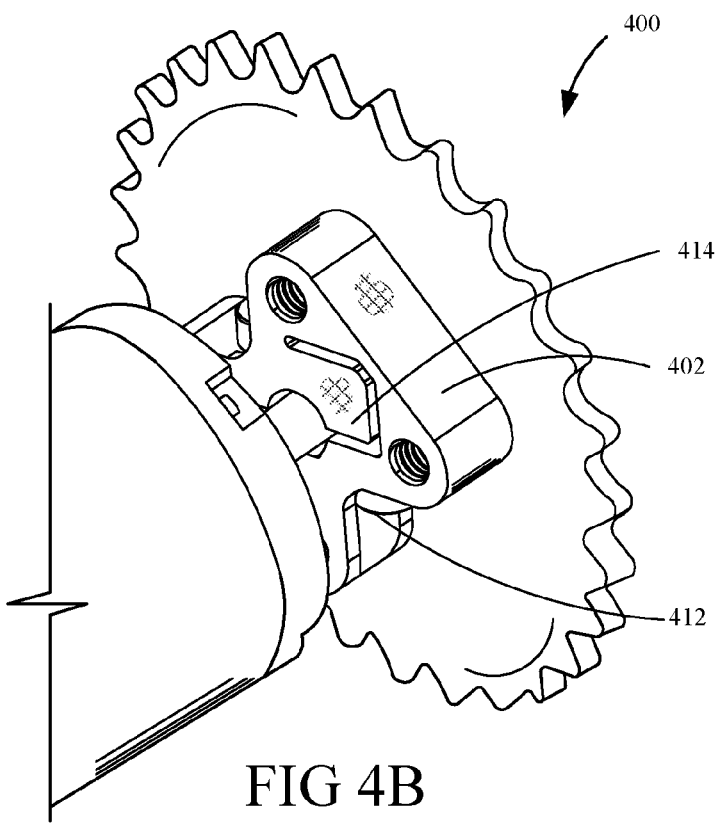

FIG. 4B illustrates a rear view of one example of an attachment assembly. Hub 402 and accessory 406 are coupled together by fasteners 408 being threaded into apertures of accessory receiver 410. In other examples, hub 402 and accessory 406 are coupled together in a different way. Hub 402 is coupled to shaft 404 through clamp 414 and fastener 412.

Figure 4C:
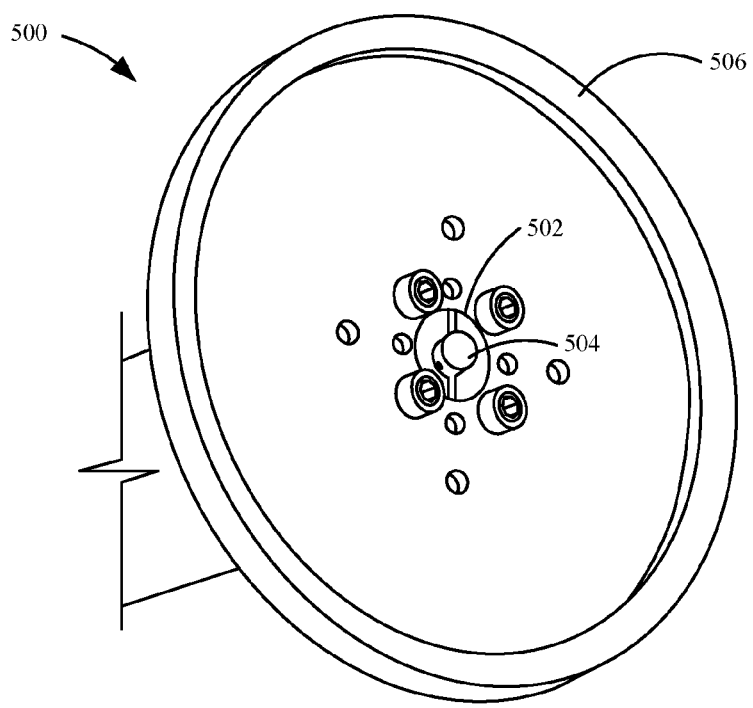
Figure 4D:
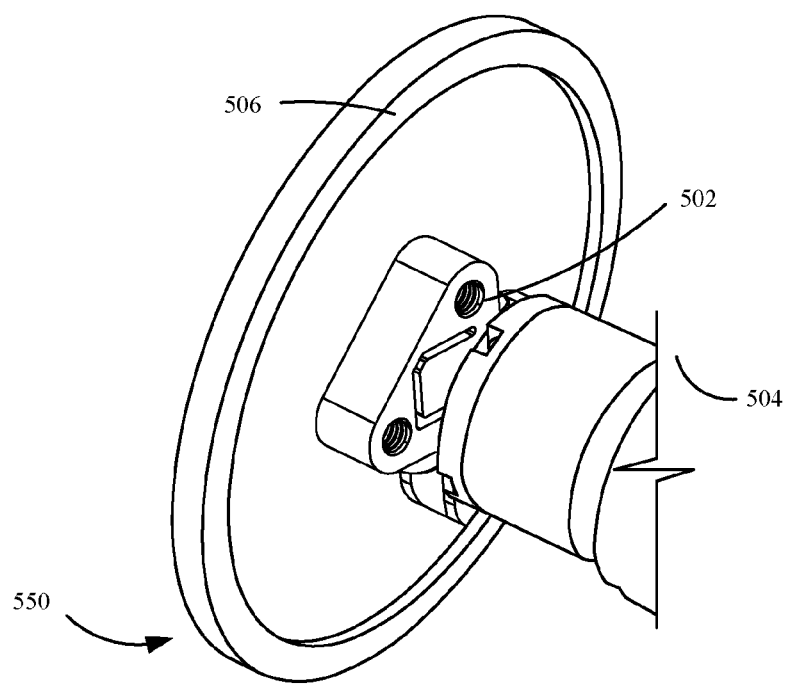

FIGS. 4C and 4D are views of one example of an attachment assembly, in accordance with embodiments of the present invention. Hub assemblies 500 and 550 comprise hub 502, accessory 506 and shaft 504. As shown, accessory 506 is a wheel and, in one example, couples similarly to accessory 506 and hub 502.

Figure 4E:
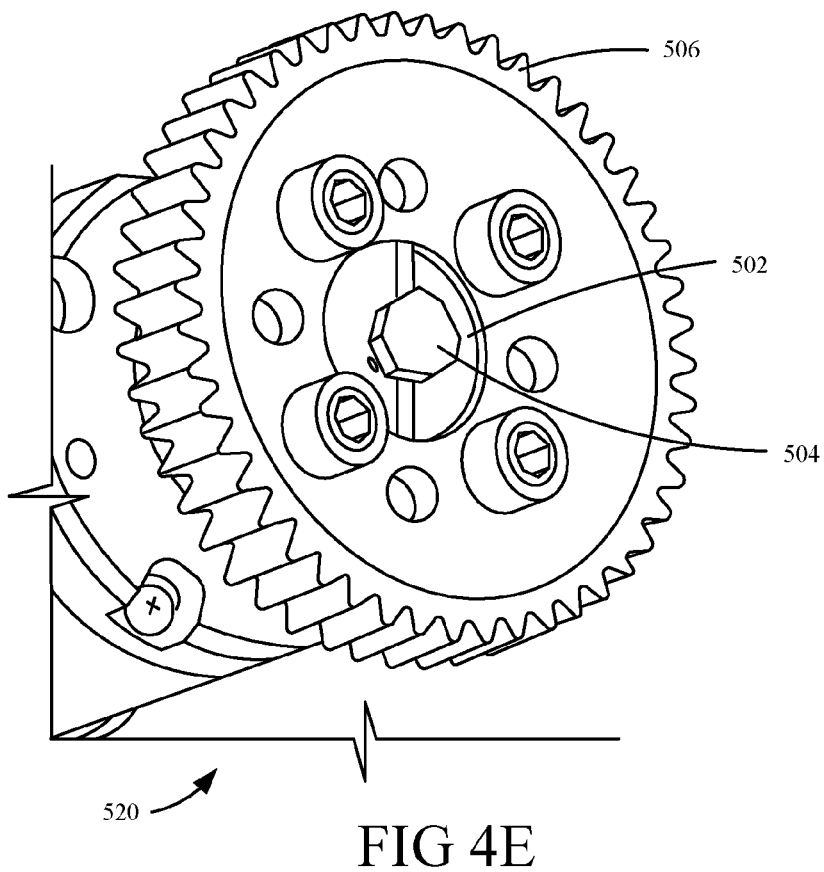
Figure 4F:
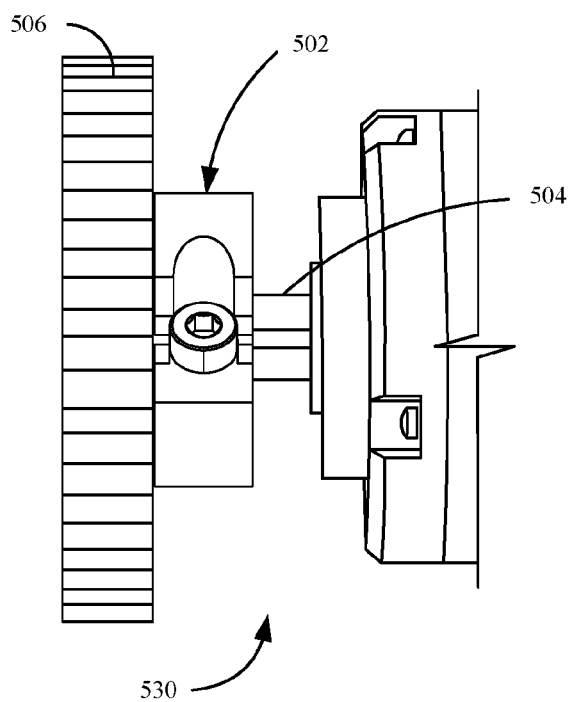

FIGS. 4E and 4F are views of one example of an attachment assembly, in accordance with embodiments of the present invention. Hub assemblies 520 and 530 comprise hub 502, accessory 506 and shaft 504. As shown, accessory 506 is a gear and, in one example, couples similarly to accessory 506 and hub 502.

Figure 5:
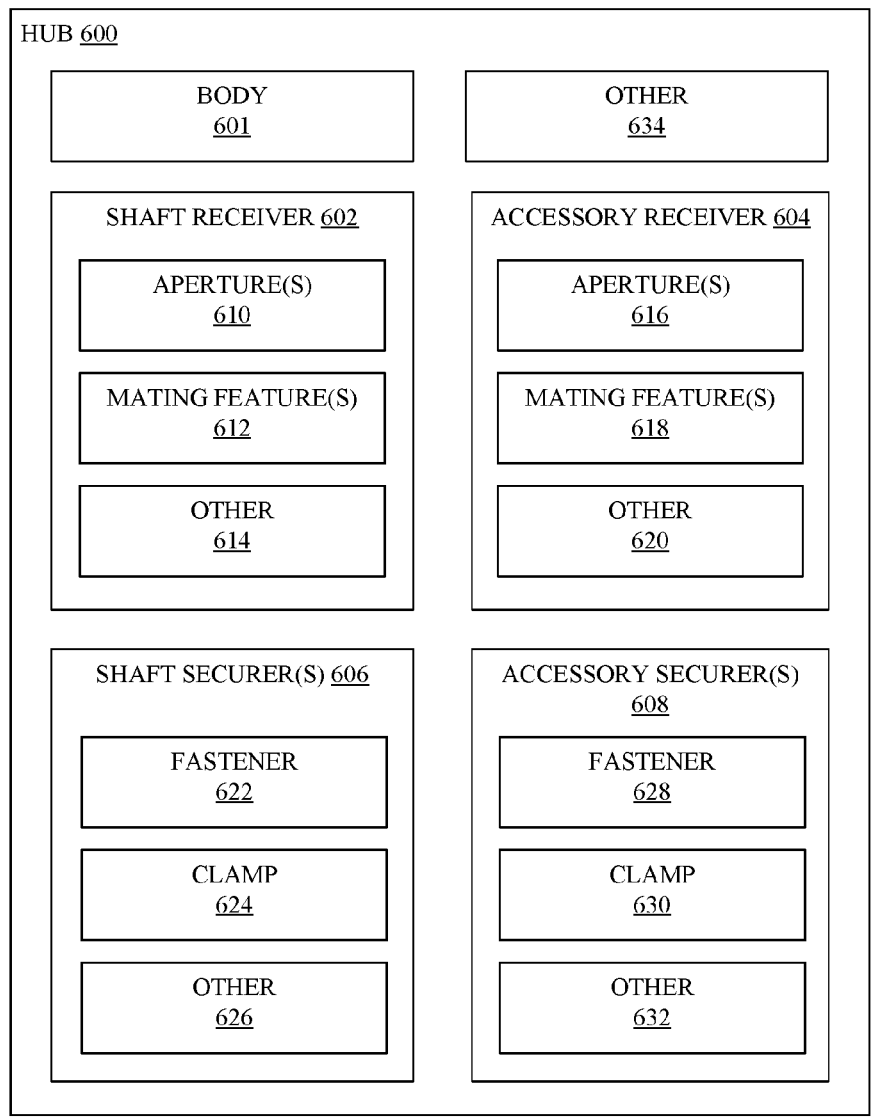
FIG. 5 is a block diagram of one example of an attachment hub

FIG. 5 illustrates a block diagram of one example of an attachment hub. Hub 600 includes a shaft receiver 602, an accessory receiver 604, a shaft securer 606, an accessory securer 608 and a body 601. Hub 600 may also comprise other components as indicated by block 634. Body 601 can comprise a singular (e.g., machined, forged, cast, etc. from one piece) or multiple components (e.g., a plurality of components coupled together to form the body). Body 601 can comprise a variety of different materials, such as, but not limited to, aluminum, steel, brass, plastics, etc. Body 601 can be shaped for various different purposes. For example, body 601 can be shaped to balance the hub in high speed rotation applications. As another example, body 601 can be tightly shaped or contoured around hub features to reduce weight (e.g., hub 100 has an overall rectangular shape, however, there is a cutaway contour where the fasteners inserted into hub 100 that gives hub 100 an overall hourglass shape).

Shaft receiver 602 includes apertures 610 and mating features 612 and can include other items as well as indicated by block 614. Apertures 610 can be shaped to accommodate different shafts. Some examples of suitable shapes include a circle, keyed circle, semi-circle, splined, D shape or hexagon, as well as any other suitable shape. Mating features 612 can include a feature that corresponds to a feature of the shaft. For example, splines, an index portion that aligns with a D-shaped shaft, etc.

Aperture 610 may also comprise an extrusion. For example, alignment extrusion 120. An extrusion can increase the contact surface area between the aperture 610 and an inserted shaft. An extrusion can also be shaped to aid in alignment of an accessory or shaft. For example, an extrusion can have an indexing feature that aides in alignment of an attached accessory. In one example, aperture 610 is substantially 1 inch in diameter. In one example, aperture 610 is substantially 15 mm in diameter. In one example, aperture 610 is substantially 21 mm in diameter. In one example, aperture 610 is substantially 22 mm in diameter. In one example, aperture 610 is substantially 25 mm. In one example, aperture 610 is substantially 1.5 inch in diameter. However, aperture 610 may be any other suitable size in diameter, depending on the application. Aperture 610 may also comprise other components as indicated by block 614. Shaft receiver 602 interacts with shaft securer 606 to secure a shaft in shaft receiver 602.

Shaft securer 606 is configured to secure a shaft, pipe or other accessory inserted into shaft receiver 602. In one example, shaft securer includes a clamp 624, fasteners 622 and can include other items as well as indicated by block 626. The clamp can further include one or more of the following: a threaded aperture, a clearance aperture and a gap. However, clamp 624 can include other components. In one example, fastener 622 is inserted through its respective clearance aperture and comes into a threaded connection with a threaded aperture to reduce the size of the gap. The gap can be in operational communication with aperture 610 of shaft receiver 602, such that a reduction in the size of the gap, reduces the size of aperture 610. In one example, fastener 622 is a 6-32 machine screws with a socket hex cap head. In another example, fastener 622 is a M4 machine screw with a socket hex cap head.

Accessory receiver 604 receives an accessory. Accessory receiver 604 can include apertures that receive fasteners or components (e.g., protruding components that fit within the aperture) from an accessory as indicated by block 616. Accessory receiver 604 can also include through holes that receive fasteners from an accessory. Using through holes may require fasteners on both sides of accessory receiver 604. Accessory receiver 604 may also couple accessory to hub 600 using in another connection mechanism as indicated by block 620. Hub 600 also includes accessory securer(s) 608. Accessory securers 608 can secure the accessory to hub 600. Accessory securer(s) 608 can include fasteners as indicated by block 628. Fasteners may be fed through an aperture of the accessory into the aperture of hub 600. The fastener can be tightened to complete the coupling. In one example, a clamp, similar to the clamp used to secure a shaft, can be used to secure the accessory. For instance, the accessory may be another shaft and is inserted in an opposing side of aperture 610. The accessory may be secured in other ways as well, as indicated by block 632.

Figure 6:
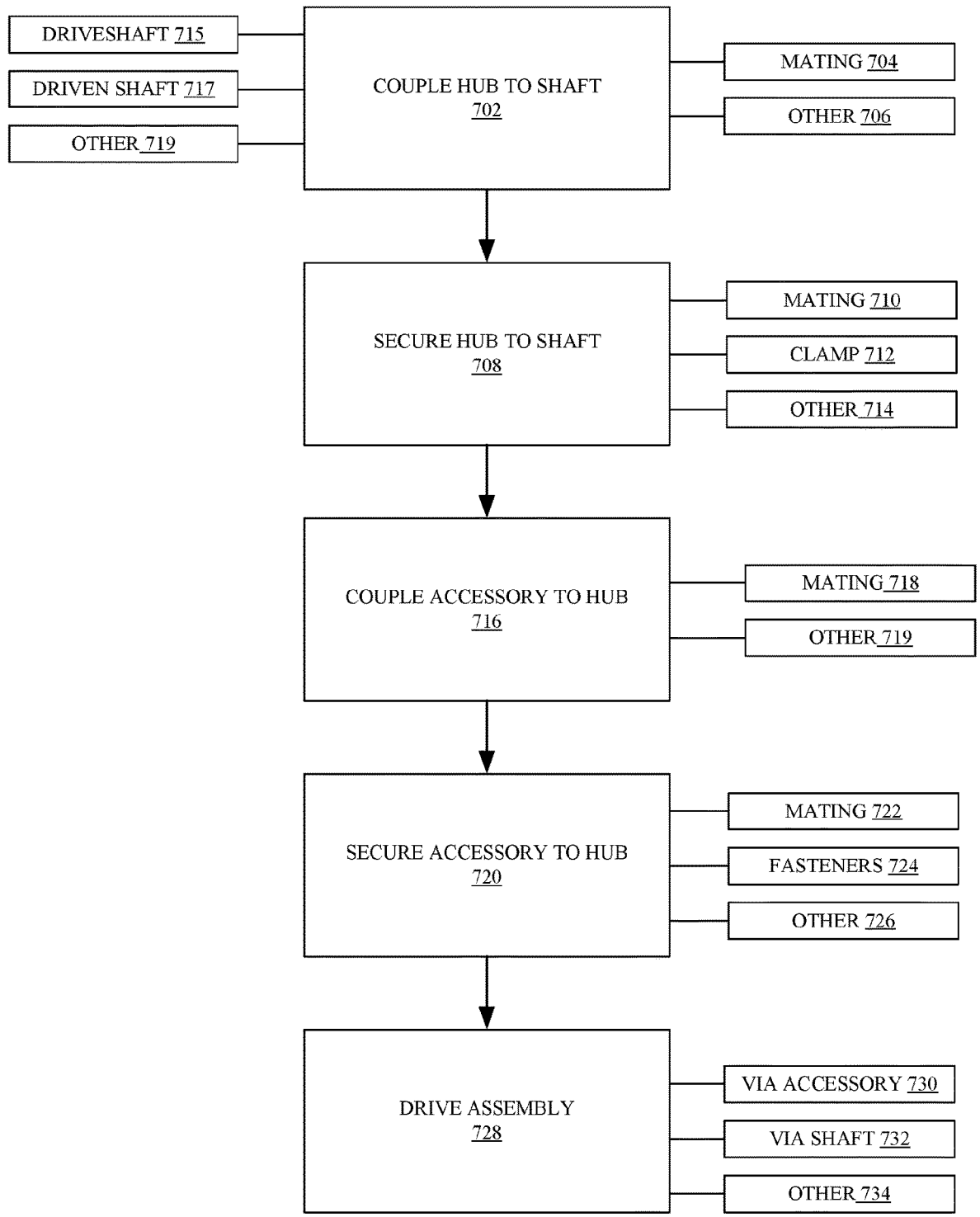
FIG. 6 is a flow diagram showing one example operation of a clamping hub.

FIG. 6 is a flow diagram showing one example operation of one or more of the hubs as described above.

At block 702, the hub is coupled onto the shaft. The shaft can be a driveshaft as indicated by block 715. For example, the output shaft of a hobby servo motor or the output shaft of a stepper motor. The shaft can be a driven shaft as indicated by block 717. For example, a shaft supported by ball bearings or bushings. The shaft can be other types of shafts as well as indicated by block 719.

The hub may comprise features that correspond and mate with features on the shaft, as indicated by block 704. An example of a mated feature may include a flat (d-shaft), splines or protruding features (teethed shaft) on the shaft. The hub may also fit on the shaft in other ways as well as indicated by 706. For example, the hub may loosely or otherwise fit on the shaft.

At block 708, the hub is secured onto the shaft. Securing the hub may involve mating of features of the hub and shaft, as indicated by block 710. For example, internal splines of a shaft aperture of the hub can mate with splines of the shaft. Securing the hub may involve a clamp force, as indicated by block 712. A clamp force can be applied through one or more threaded connections as described above. For example, in FIG. 3 the threaded connection between first fastener 132 and threaded aperture 142 of first deformable feature 116. A clamp force may also be applied through a locking lever mechanism. Securing the hub may also involve other mechanisms, as indicated by block 714.

At block 716, an accessory is coupled to the hub. The accessory can have a feature that mates with the hub, as indicated by block 718. For example, the accessory has a hexagonal aperture that corresponds and mates with a hexagonal extrusion of the hub. As another example, the accessory may have a non-symmetrical aperture that corresponds with an extrusion of the hub. A non-symmetrical shape would ensure that the accessory was coupled to the hub in a specific orientation. The accessory may also fit loosely or otherwise on the hub, as indicated by block 719.

At block 720, the accessory is secured to the hub. Securing the accessory may involve mating of features on the accessory and hub, as indicated by block 722. For example, alignment of features on the accessory (aperture, extrusion, etc.) with features of the hub (aperture, extrusion, etc.). Securing the accessory may involve tightening of fasteners, as indicated by block 724. For example, some examples of fasteners are socket cap screws, machine screws, bolts, rivets, pins, etc. Securing the accessory may involve other mechanisms as well, as indicated by block 726.

At block 728, the assembly is driven. The assembly may be driven via the accessory as indicated by block 730. For example, the assembly can be driven via the accessory when the shaft is not a drive shaft and the accessory is a gear/pulley/sprocket/etc. driven by motor. The assembly may be driven via the shaft, as indicated by block 732. For example, the shaft is a shaft of a servo motor. Driving the assembly can also be completed via other means as well, as indicated by block 734.

Examples of the present invention provide many improvements and features not currently in use. One of these features includes the clamp gap locations. Another new feature is the aperture 0.770" diagonal and 16 mm×16 mm patterns. Another new feature is the sizing of the apertures to mate with or be threaded to match standard components. Another new feature is the symmetry of the shaft securing fasteners for a reduced wobble in high speed rotation applications. Another new feature is the center of mass of the hub is substantially on the center of rotation for a reduced wobble in high speed rotation applications. Another new feature is that the deformable components of the hub can provide a clamping force on a shaft without deforming the apertures that receive an accessory. Additionally, there are other new features disclosed herein not found in any past disclosures.

Although the present invent some ion has been described with reference to preferred embodiments, workers skilled in the art will recognize that changes may be made in form and detail without departing from the spirit and scope of the invention.

What is claimed is:

1. A clamping hub comprising:
   a body;
   an aperture, defined by the body, configured to receive a shaft;
   a clamp configured to secure the shaft in the aperture, the clamp comprising:
      a first deformable component that defines a first portion of the aperture and configured to, when deformed, change a size of the aperture;
      a second deformable component that defines a second portion of the aperture opposite from the first portion of the aperture and configured to, when deformed, change the size of the aperture; and
      wherein the first deformable component and the second deformable component are defined, at least in part, by a S shaped slot formed in the body, wherein the S shaped slot forms an S shape on a plane that is tangential to an axis of the aperture.

2. The clamping hub of claim 1, wherein the clamp further comprises:
   a first fastener, configured to, when actuated, deform the first deformable component; and
   a second fastener, configured to, when actuated, deform the second deformable component.

3. The clamping hub of claim 2, wherein the first fastener engages a first threaded aperture of the first deformable component and the second fastener engages a second threaded aperture of the second deformable component.

4. The clamping hub of claim 2, wherein the first fastener is disposed in a first concave portion of the body and the second fastener is disposed in a second concave portion of the body opposite of the first concave portion.

5. The clamping hub of claim 2, wherein the clamp further comprises:
   a third fastener, configured to, when actuated, deform the first deformable component; and
   a fourth fastener, configured to, when actuated, deform the second deformable component.

6. The clamping hub of claim 1 further comprising three or more accessory mounting apertures configured to couple the clamping hub to an accessory and wherein the first deformable component is disposed at a location within a convex hull defined by locations of the three or more accessory mounting apertures.

7. The clamping hub of claim 6, wherein the body comprises an extrusion that extends around the aperture on the first deformable component and the second deformable component.

8. The clamping hub of claim 7, wherein the extrusion comprises a mating feature that couples to a corresponding mating feature of the accessory.

9. The clamping hub of claim 1 wherein the first deformable component and the second deformable component are portions of the body defined by a channel in the body that extends through the aperture.

10. The clamping hub of claim 1, wherein a center of mass is located on a rotational axis of the shaft.

11. The clamping hub of claim 1, wherein the body comprises plastic.

12. The clamping hub of claim 1, wherein the body comprises aluminum.

13. A shaft-accessory coupling system comprising:
   a shaft;
   a hub comprising:
      an aperture;
      a clamp disposed around the aperture and configured to tighten and reduce a cross sectional area of the aperture;
      wherein the clamp comprises a first gap in the hub extending from the aperture in a first direction and a second gap in the hub extending from the aperture in a second direction that is opposite the first direction, wherein a size of each the first gap and the second gap are adjustable;
      wherein the first gap couples to a third gap that extends laterally from the first gap;
      wherein the second gap couples to a fourth gap that extends laterally from the second gap;
      wherein the third gap couples to a fifth gap that extends laterally from the third gap;
      wherein the fourth gap couples to a sixth gap that extends laterally from the fourth gap;
      accessory mounting apertures configured to receive coupling fasteners that couple an accessory to the hub; and
      wherein the shaft is received by the aperture and secured in the aperture by the tightening of the clamp and when the clamp is tightened, positions of the accessory mounting apertures relative to one another remain substantially constant.

14. The shaft-accessory coupling system of claim 13, wherein a size of the first gap is reduced by tightening a first fastener and wherein a size of the second gap is reduced by tightening a second fastener.

15. The shaft-accessory coupling system of claim 14, wherein a spacing of the accessory mounting apertures is substantially a 0.544 inch by 0.544 inch square.

16. The shaft-accessory coupling system of claim 13, wherein the hub is rotationally balanced about the shaft.

* * * * *